Figure 4:
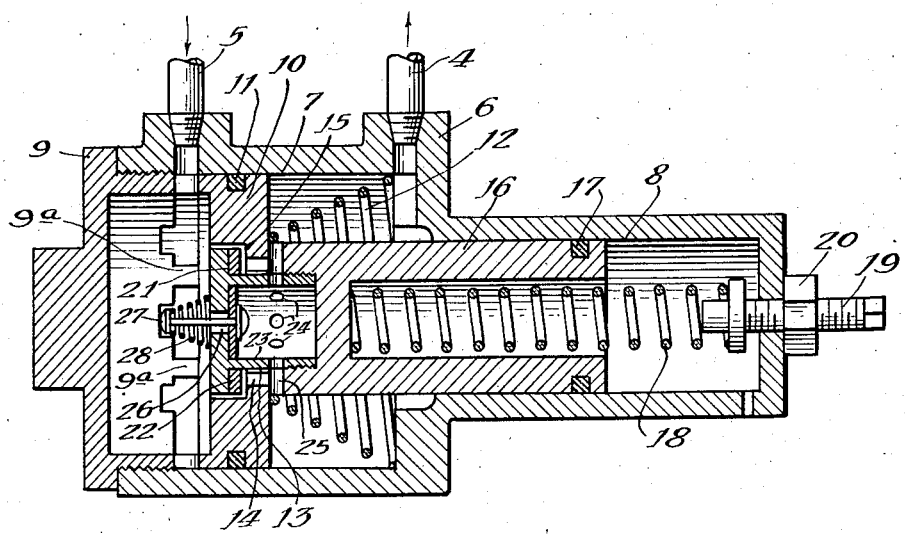

Oct. 1, 1946.    R. R. GUNDERSON    2,408,513
FLUID PRESSURE PRODUCING DEVICE
Filed Jan. 6, 1945    2 Sheets-Sheet 1
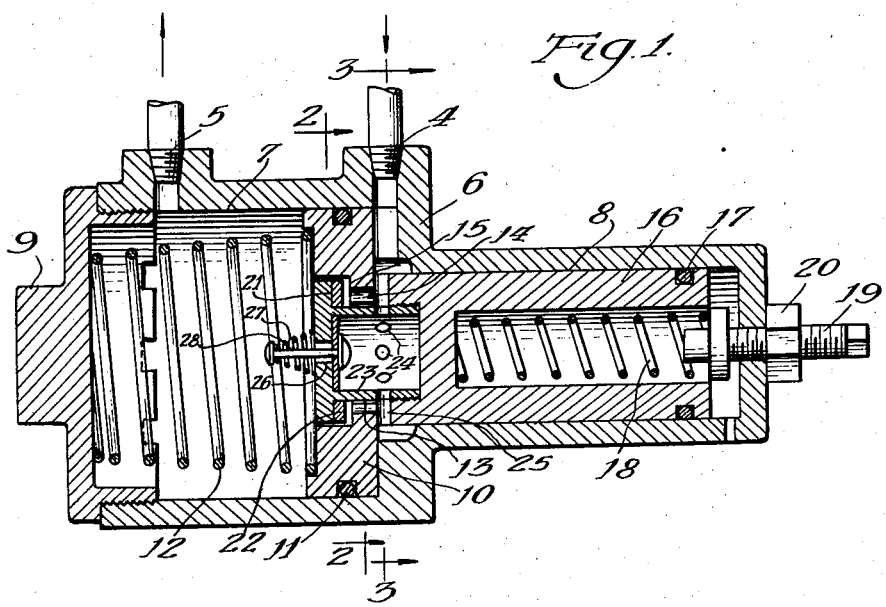
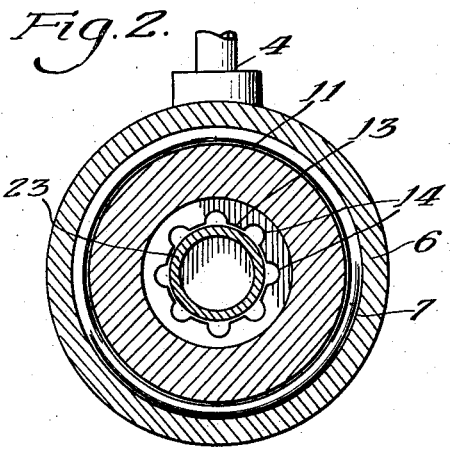
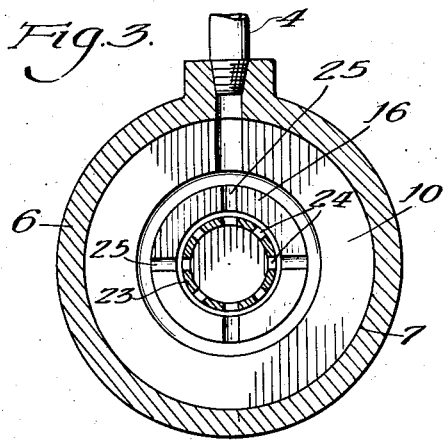
Inventor:
Ralph R. Gunderson
By:
Chritton, Wiles, Schroeder, Merriam
and Hofgren
Attorneys Oct. 1, 1946.  R. R. GUNDERSON  2,408,513
FLUID PRESSURE PRODUCING DEVICE
Filed Jan. 6, 1945  2 Sheets-Sheet 2

Inventor:
Ralph R. Gunderson
By:
Chritton, Wiles, Schroeder, Merriam & Hofgren
Attorneys Patented Oct. 1, 1946

2,408,513

UNITED STATES PATENT OFFICE 2,408,513

FLUID PRESSURE PRODUCING DEVICE

Ralph R. Gunderson, Chicago, Ill.

Application January 6, 1945, Serial No. 571,582

9 Claims. (Cl. 60—54.6)

This invention relates to fluid pressure producing devices wherein the pressure is automatically raised or lowered depending on how the device is arranged, and more particularly to fluid pressure changing devices adapted for use in connection with hydraulic brake systems.

The primary object of the invention is to provide a simple and reliable device for raising or lowering the fluid pressure in a line by use of a piston having a substantially greater effective area on the low pressure side than the effective area on the high pressure side.

Another object of the invention is to provide a fluid pressure changing device wherein one automatic valve permits the fluid to travel from the high pressure side to the low pressure side of the piston until a predetermined pressure is reached on the low pressure side; and a check valve is provided to permit fluid to pass from the low pressure side of the piston to the high pressure side whenever the pressure on the high pressure side drops below that on the other side.

In motor vehicles it is the usual practice to adjust hydraulic brakes so that more braking pressure is applied to the front wheels than the rear wheels. In trucks, with or without trailers, it has been found that on slippery pavements, particularly in winter, the front wheels are likely to skid before the brakes are exerting their maximum force on the rear wheels, and as a result the driver is apt to lose control of the vehicle.

Usually the two front hydraulic brakes operate from one pipe which is connected to another pipe which operates the brakes on the two rear wheels. These pipes each receive their brake operating fluid through a junction pipe connected to the single operating cylinder. The device of the present invention may be connected into the line which operates the front brakes, so that the pressure to the front brakes will be reduced automatically. On the other hand, the device may be arranged in the pipe to the rear brakes so as to increase the pressure to the rear brakes.

The invention is illustrated in a preferred embodiment in the accompanying drawings in which—

Figure 1 is a longitudinal sectional view of apparatus embodying the invention; Fig. 2, a transverse sectional view taken as indicated at line 2—2 of Fig. 1; Fig. 3, a transverse sectional view taken as indicated at line 3—3 of Fig. 1; and Fig. 4 a sectional view similar to Fig. 1, but showing a modified assembly to make a pressure increasing device.

In the embodiment illustrated in Figs. 1 to 3, the apparatus is arranged for connection in series with the pipe leading to the front brakes, so as to reduce the pressure in the line from the inlet port 4 to the high pressure side of the cylinder to the outlet port 5 on the low pressure side of the cylinder leading to the front brake cylinders on the wheels. A cylinder member 6 has an operating cylinder 7 of large diameter, and a communicating cylinder 8 of much smaller diameter. The large cylinder is provided with a removable head 9, to permit assembly of the inner parts of the device.

A piston 10 provided with a suitable packing ring 11 is mounted in the cylinder 7, and is urged towards the high pressure end of the cylinder by a coil spring 12. The piston has a central aperture 13 with enlarged channels 14 terminating in a counter-bored seat 15 of a valve.

A plunger member 16 provided with a packing ring 17 is mounted in the cylinder 8, and is urged towards the piston by a compression spring 18, which is adjustable longitudinally by means of the stud 19 which is threaded through the cylinder member 6, and is provided with a lock nut 20. The plunger is provided at its front end with a valve head 21, having a head portion provided with packing 22 to fit into the seat 15 of the piston, and close the apertures 13 and 14. The valve head has a hollow neck portion 23, which makes a lost motion connection with the piston through the aperture 13. The neck portion is provided with ports 24 which communicate with slots 25 in the end of the plunger 16, and lead to the high pressure side of the piston 10.

The valve head 21 is apertured as indicated at 26, and is provided with a check valve 27 which is urged to closed position by a coil spring 28. This check valve permits fluid to pass from the low pressure side of the piston to the high pressure side, when the fluid pressure on the high pressure side is relieved.

When the brakes are released the parts will assume the position shown in Figure 1. When brake liquid is introduced through the port 4 from the master cylinder or operating cylinder, liquid will pass through the ports 14 to the low pressure side of the cylinder 7 and the outlet port 5, until there is sufficient pressure on the piston 16 to cause the head 21 to seat and close the valve. Thereafter, high pressure liquid entering the port 4 will press against the piston 10 and cause it to force liquid at low pressure through the outlet port 5. As the effective area of the piston 10 is smaller on the plunger side of the piston than the effective area on the low pressure side, a drop of pressure from the outlet 5 results. When pressure through the inlet port 4 is reduced by the master cylinder below that of the low pressure side of the piston, the check valve 27 will open and permit the liquid to flow back, while the spring 12 returns the piston to the position illustrated in Fig. 1. Thus it will be understood that the valve head 21 permits liquid to flow initially to the low pressure side, until a predetermined pressure is reached. This pressure is controlled by the compression of the spring 18 which may be adjusted by means of the stud 19. The brake liquid that is introduced through the large valve is subsequently returned through the same valve, or the check valve 27, or both.

As shown in the modification in Fig. 4, if it is desired to use the device to cause an increase in pressure on brake fluid for rear wheels of a vehicle, the head 9 may be removed, and a spring 12 installed in the cylinder 7 on the opposite or high pressure side of the piston 10. With this arrangement, it will be understood that the port 5 must become the inlet port and connected to the master cylinder or operating cylinder, while the high pressure port 4 will be connected to the line leading to the rear wheel brake cylinders. Stops 9a, on the head 9 should be long enough to prevent the piston from closing the inlet port 5.

By a suitable by-pass valve, the device may be thrown into or out of operation by the operator, when desired.

The foregoing detailed description is given for clearness of understanding only, and no unnecessary limitations should be understood therefrom, for some modifications will be obvious to those skilled in the art.

I claim:

1. A fluid pressure producing device comprising: a cylinder member having a cylinder of large diameter and a cylinder of smaller diameter, a piston in the large cylinder, a valve-head seating in said piston, a fluid port in said large cylinder at one end of the travel of said piston and a second port near the other end of said travel, a plunger in said smaller cylinder connected to said valve head, spring means urging said plunger towards said piston to unseat the valve-head, and a spring in the large cylinder urging the piston towards one end of its travel.

2. A fluid pressure producing device comprising: a cylinder member having a cylinder of large diameter and a cylinder of smaller diameter, a piston in the large cylinder, a plunger in said smaller cylinder making a lost motion connection with said piston and forming a valve through the piston, an inlet port in said large cylinder near one end of the travel of said piston and an outlet port near the other end of said travel, spring means urging said plunger towards the piston to open said valve and establish communication between said ports, and a spring in the large cylinder urging the piston towards the inlet port.

3. A device as specified in claim 2, including a check valve permitting fluid to pass therethrough only from the low pressure side of the piston to the high pressure side of said piston.

4. A device as specified in claim 2, in which the plunger has an enlarged hollow head portion in the piston exposed to the low pressure side of said piston, said head portion having ports maintaining communication with the high pressure side of the piston, and a check valve is provided in the head portion to permit fluid to pass only from the low pressure side to the high pressure side of said piston.

5. A device as specified in claim 2, in which the spring means comprises a compression coil spring carried in the plunger, and means is provided on the cylinder member for adjusting the compression in said spring.

6. In a brake system, a pressure reducing device comprising: a cylinder member having a cylinder of large diameter and a communicating cylinder of smaller diameter, a piston in the large cylinder, a plunger in the smaller cylinder having a neck portion extending through an aperture in said piston and having a head portion adapted to seat on the piston and form a valve to close communication through said aperture when said piston is in extended position with respect to said plunger, an outlet port in said cylinder on the low pressure side of the piston, an inlet port on the high pressure side of said piston, and opposed springs for urging the plunger to valve opening position and the piston towards the high pressure end of the cylinder.

7. A device as specified in claim 6, including a spring operated check valve for permitting fluid to return therethrough only from the low pressure side of the piston to the high pressure side.

8. A device as specified in claim 6, in which the neck portion of the plunger is hollow and maintains communication with the high pressure side of the piston, and a spring operated check valve is provided in the head portion of the plunger to permit return of fluid from the low pressure side of the piston to the high pressure side through said neck portion.

9. In a brake system, a pressure increasing device comprising: a cylinder of large diameter and a communicating cylinder of smaller diameter, a piston in the large cylinder, a plunger in the smaller cylinder having a neck portion extending through an aperture in said piston and having a head portion adapted to seat on the piston and form a valve to close communication through said aperture when said piston is in extended position on said plunger, an inlet port in said cylinder on the low pressure side of the piston, an outlet port on the high pressure side of said piston, a spring for urging the plunger to valve opening position, and another spring urging the piston towards the low pressure end of the cylinder.

RALPH R. GUNDERSON.